(12) United States Patent
Winter, IV

(10) Patent No.: US 7,293,822 B1
(45) Date of Patent: Nov. 13, 2007

(54) CONVERTIBLE VEHICLE

(75) Inventor: Amos G Winter, IV, Concord, NH (US)

(73) Assignee: Appropriate Combined Technologies LLC, Bow, NH (US)

( * ) Notice: Subject to any disclaimer, the term of this patent is extended or adjusted under 35 U.S.C. 154(b) by 166 days.

(21) Appl. No.: 11/030,446

(22) Filed: Jan. 6, 2005

Related U.S. Application Data

(60) Provisional application No. 60/534,462, filed on Jan. 6, 2004.

(51) Int. Cl.
*B60J 7/00* (2006.01)
(52) U.S. Cl. .................................. 296/185.1
(58) Field of Classification Search ............. 296/185.1, 296/182.1, 156, 163, 165, 169, 173, 26.04, 296/26.06, 26.07, 193.12, 100.01–2, 100.06–100.1, 296/107.16–18
See application file for complete search history.

(56) References Cited

U.S. PATENT DOCUMENTS

| | | | |
|---|---|---|---|
| 3,419,304 A | | 12/1968 | Sangimino |
| 3,977,720 A | * | 8/1976 | Schreiberg ............... 296/185.1 |
| 4,659,136 A | | 4/1987 | Martin et al. |
| 4,776,630 A | | 10/1988 | Fukutomi et al. |
| 4,784,429 A | | 11/1988 | Hodges |
| 5,195,798 A | | 3/1993 | Klein et al. |
| 5,203,603 A | | 4/1993 | Hertzberg et al. |
| 5,209,544 A | | 5/1993 | Benedetto et al. |
| 5,806,912 A | | 9/1998 | Ramaciotti et al. |
| 6,149,217 A | | 11/2000 | Plamondon |
| 6,203,100 B1 | | 3/2001 | Gordon |
| 6,302,010 B1 | | 10/2001 | Holler |
| 6,318,793 B1 | | 11/2001 | Rapin et al. |
| 6,347,828 B1 | | 2/2002 | Rapin et al. |
| 6,428,079 B1 | * | 8/2002 | Van Dyke .............. 296/100.06 |

(Continued)

FOREIGN PATENT DOCUMENTS

EP 1176042 A1 1/2002

(Continued)

OTHER PUBLICATIONS

"Geneva Motor Show", Mar. 7, 2002, [online][retrieved on Nov. 11, 2003] Retrieved from the internet, <URL: http://www.edmunds.com/news/autshows/articles/49774/page022.html.

(Continued)

*Primary Examiner*—H. Gutman
(74) *Attorney, Agent, or Firm*—Maine & Asmus

(57) ABSTRACT

A system for retraction and deployment of a covering over at least a portion of a vehicle interior is disclosed, such as might be employed in commercial or sport utility style vehicles to provide a convertible hardtop over a portion of the vehicle that can be retracted for open air and ease of access, or closed for physical and environmental protection. The system provides: first and second roof panels; first and second sidewall panels; and posterior and anterior roll bars, each roll bar having at least one channel whereby the first and second roof panels and the first and second sidewall panels are guided between a deployed position and a stowed position, such that when the panels are in the deployed position the vehicle is enclosed and when the panels are in a stowed position the vehicle is at least partially open.

18 Claims, 13 Drawing Sheets

U.S. PATENT DOCUMENTS

| | | |
|---|---|---|
| 6,588,824 B2 | 7/2003 | Neubrand |
| 2002/0074831 A1 | 6/2002 | Sotiroff et al. |
| 2002/0079718 A1 | 6/2002 | Neubrand |
| 2002/0158491 A1 | 10/2002 | Patelczyk et al. |
| 2003/0047961 A1 | 3/2003 | Nania |
| 2006/0119124 A1* | 6/2006 | Briggs .................... 296/26.06 |

FOREIGN PATENT DOCUMENTS

| | | | |
|---|---|---|---|
| GB | 1592155 | * | 7/1981 |
| WO | WO97/14570 | | 4/1997 |

OTHER PUBLICATIONS

"All The 2003 Concept Cars", [online][retrieved on Nov. 7, 2003] Retrieved from the internet, <http://popularmechanics.com/automotive/concept_cars_/2003/2003_concept_cars/print.phtml.

"2002 Chevrolet Avalanche", Motor Trend, Jul. 2003, p. 140.

"American V8 Power", Motor Trend, Sep. 2003, p. 74.

* cited by examiner

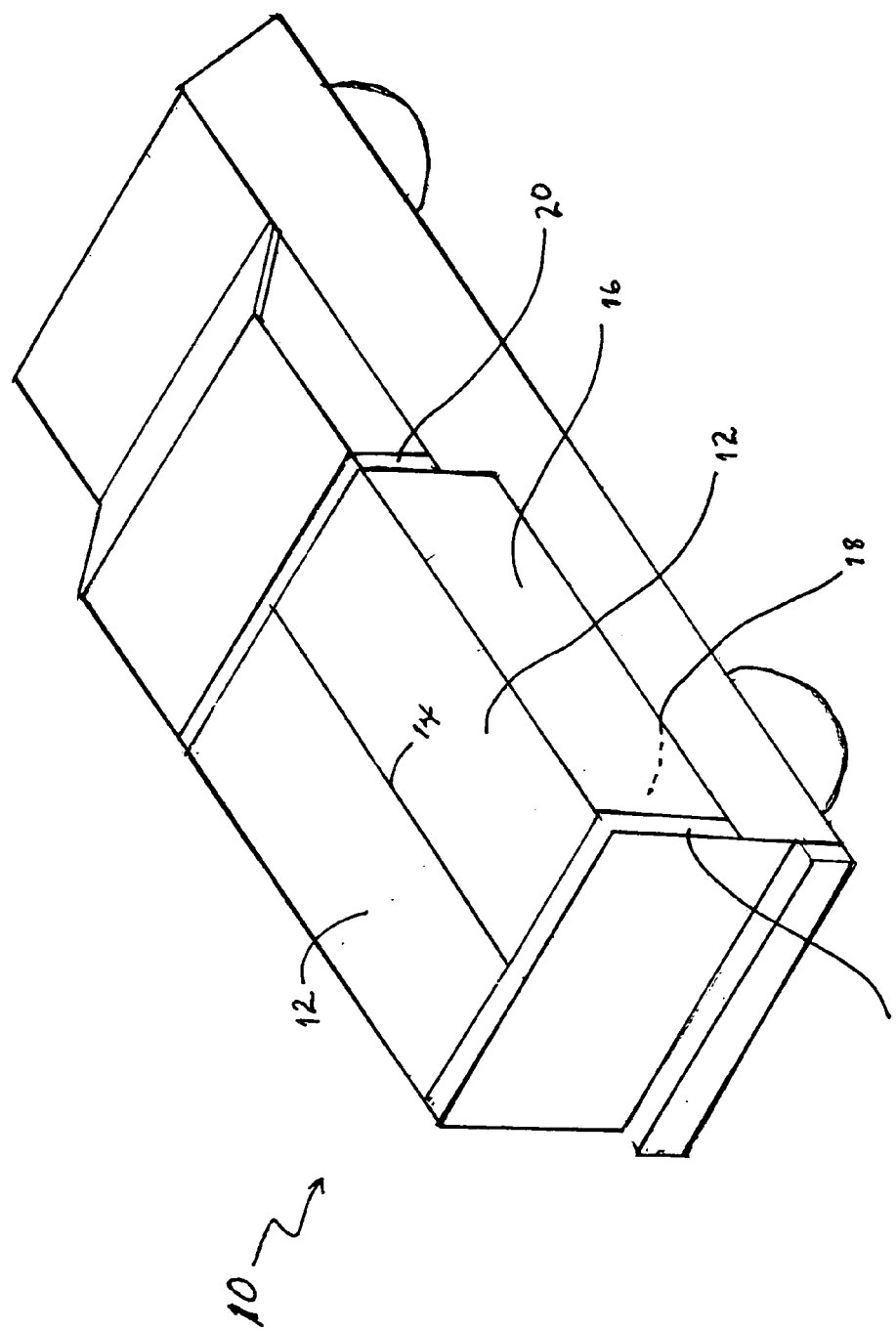

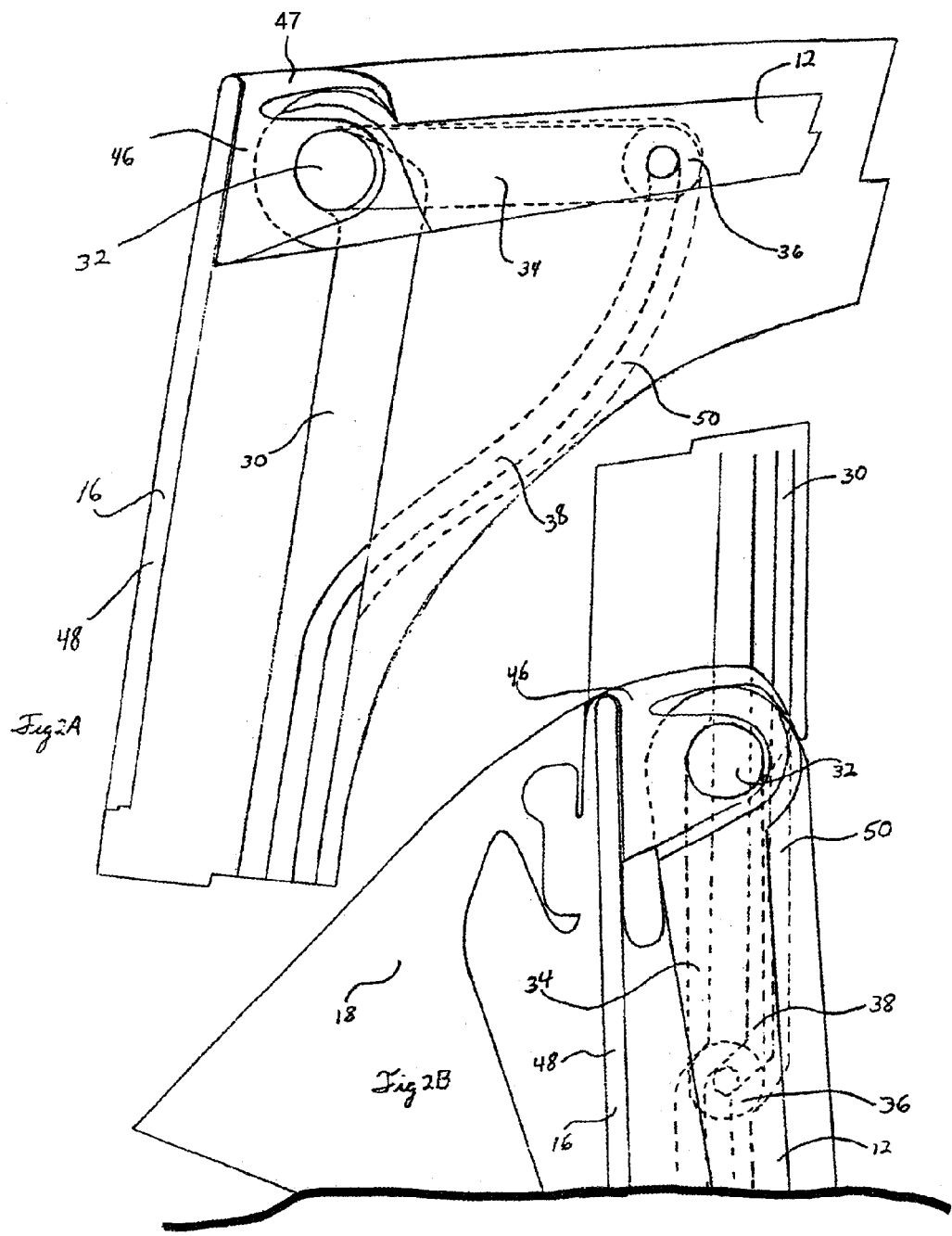

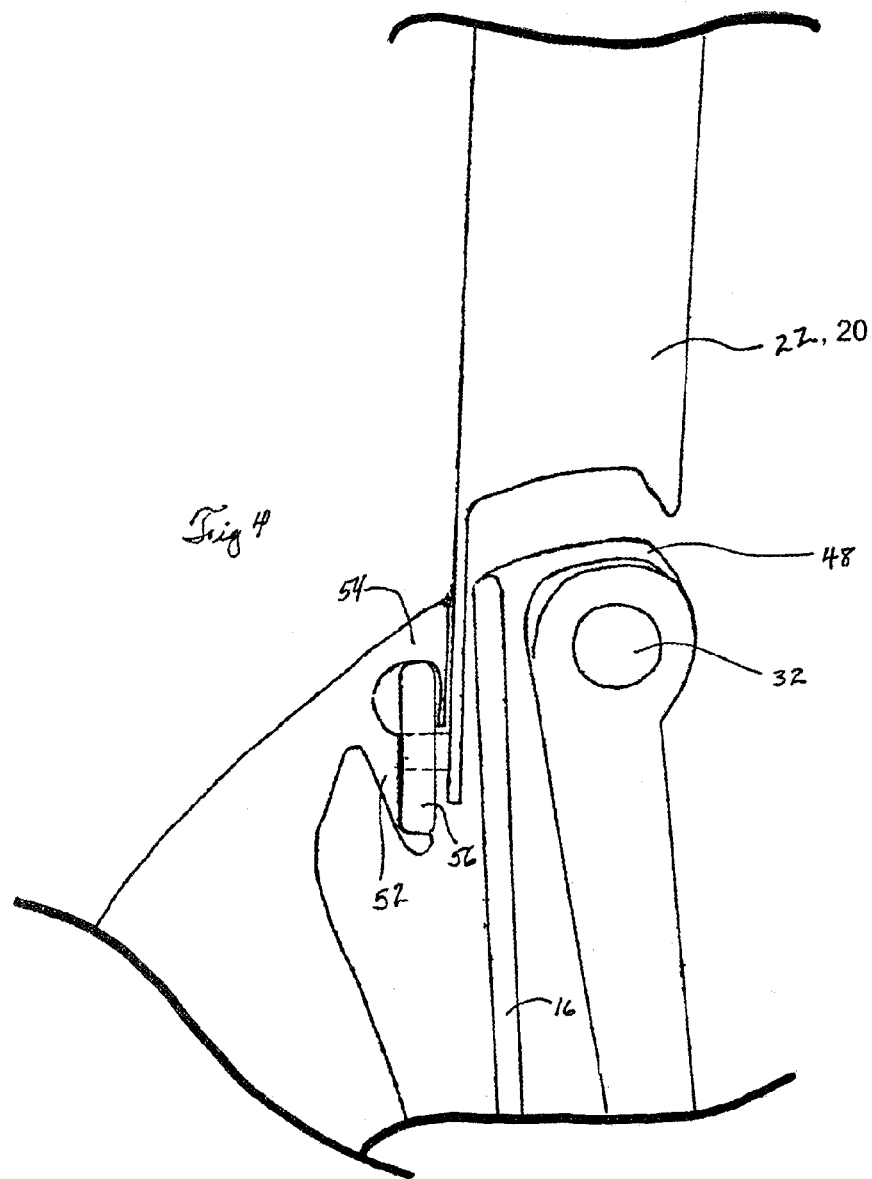

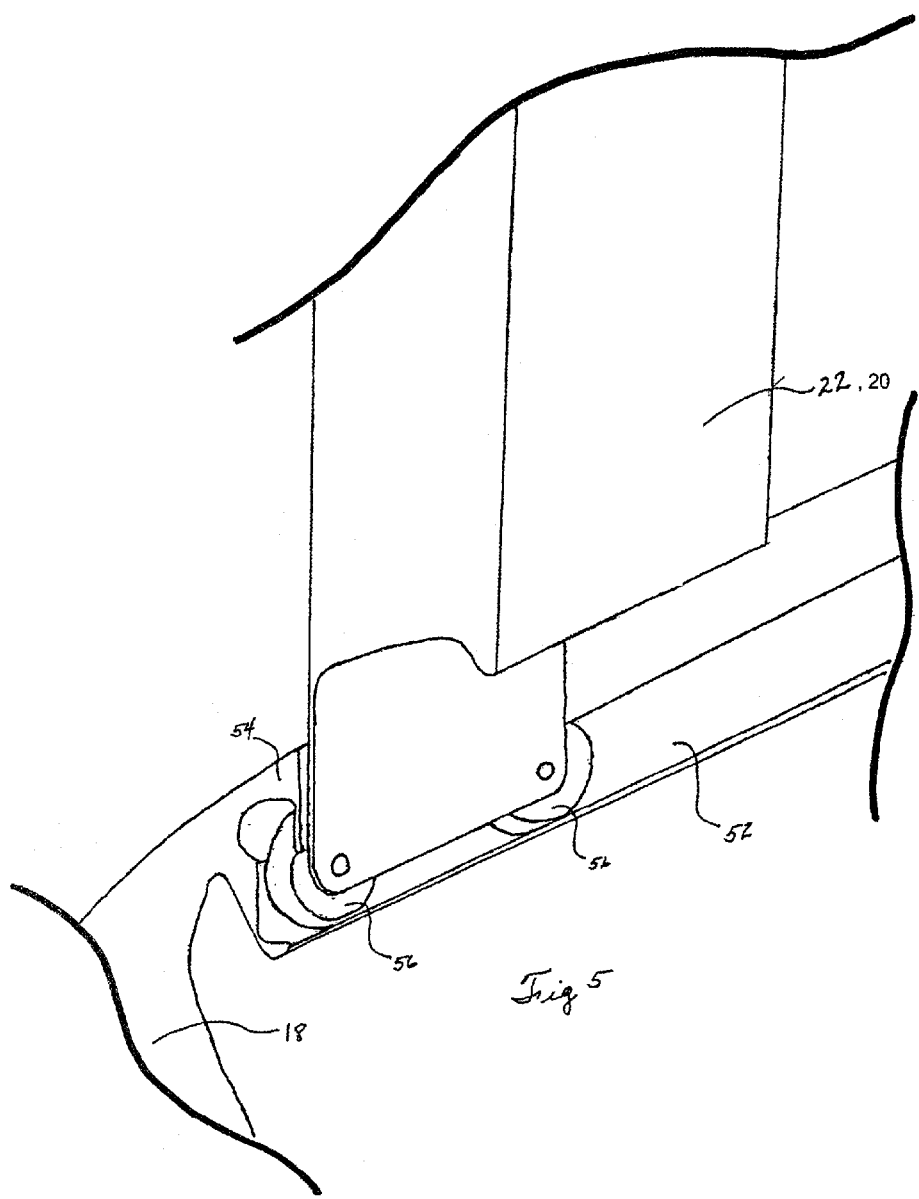

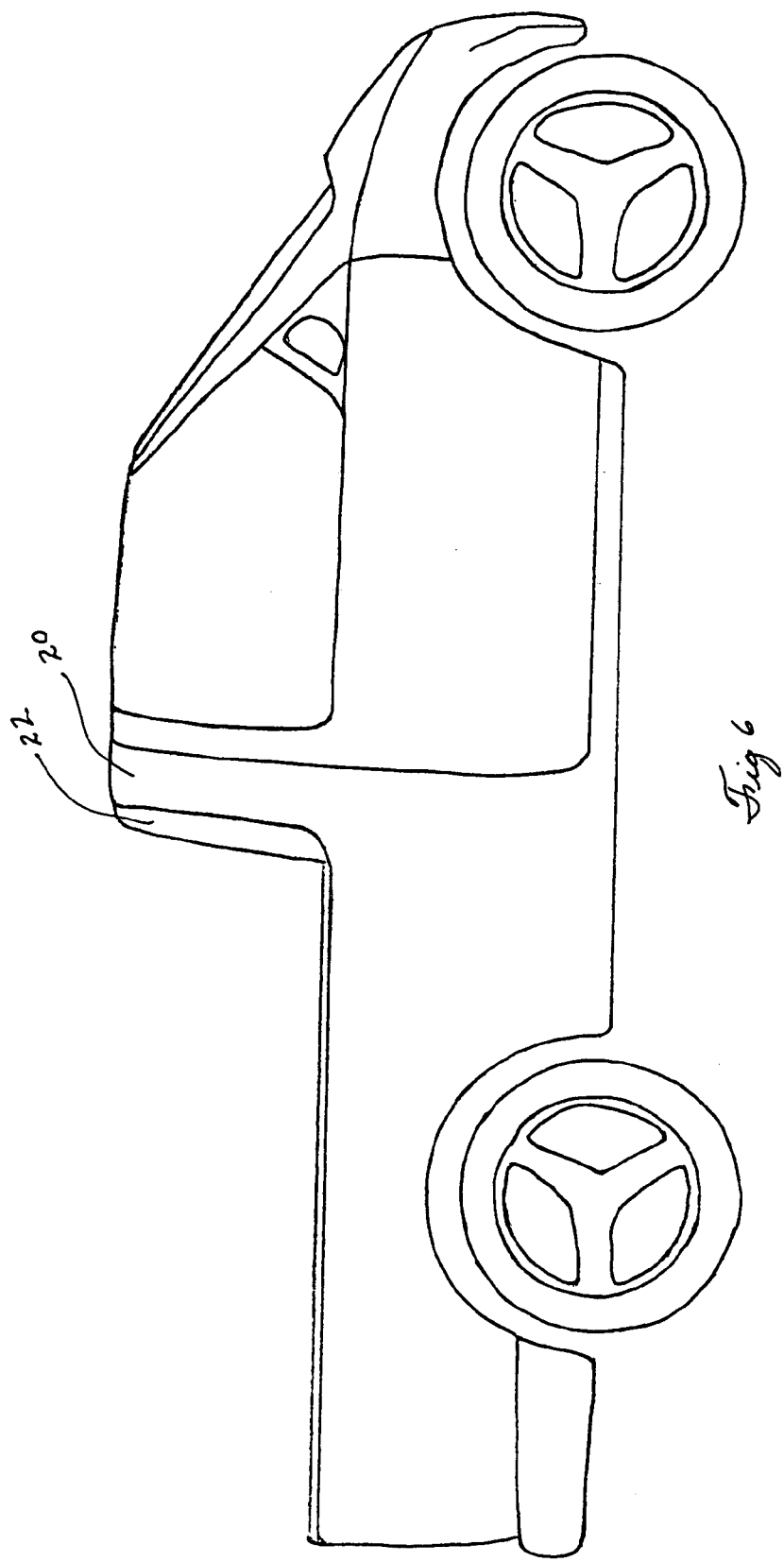

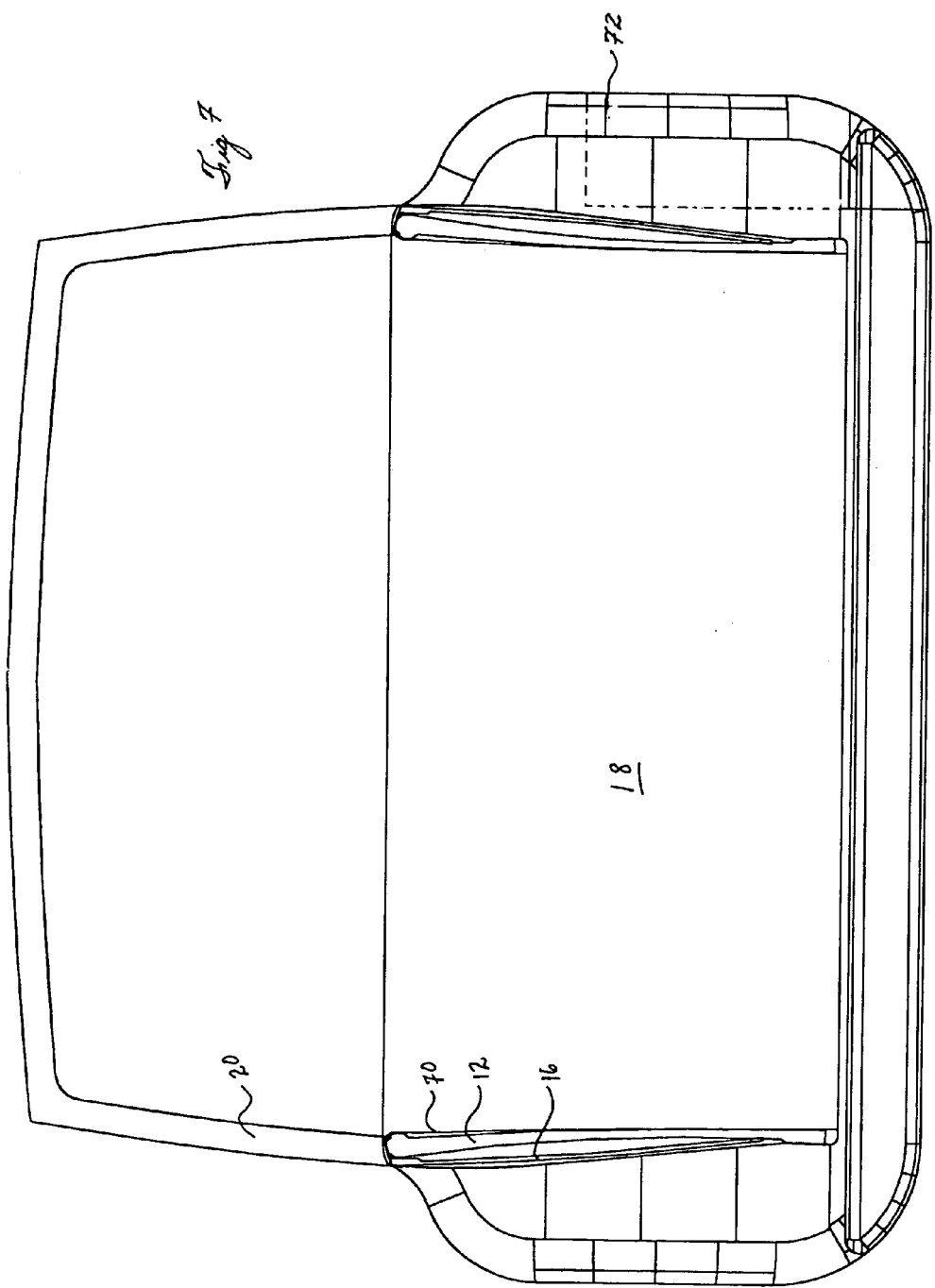

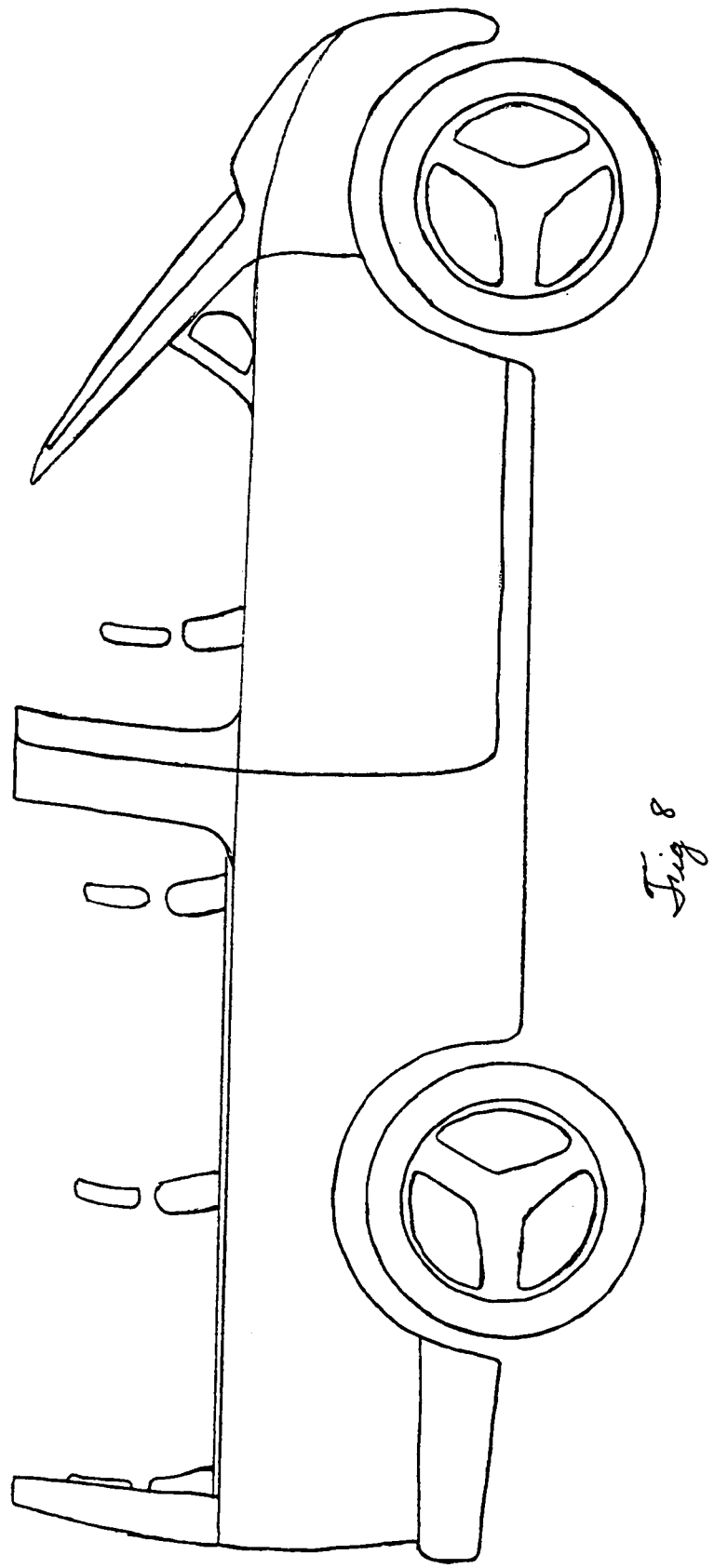

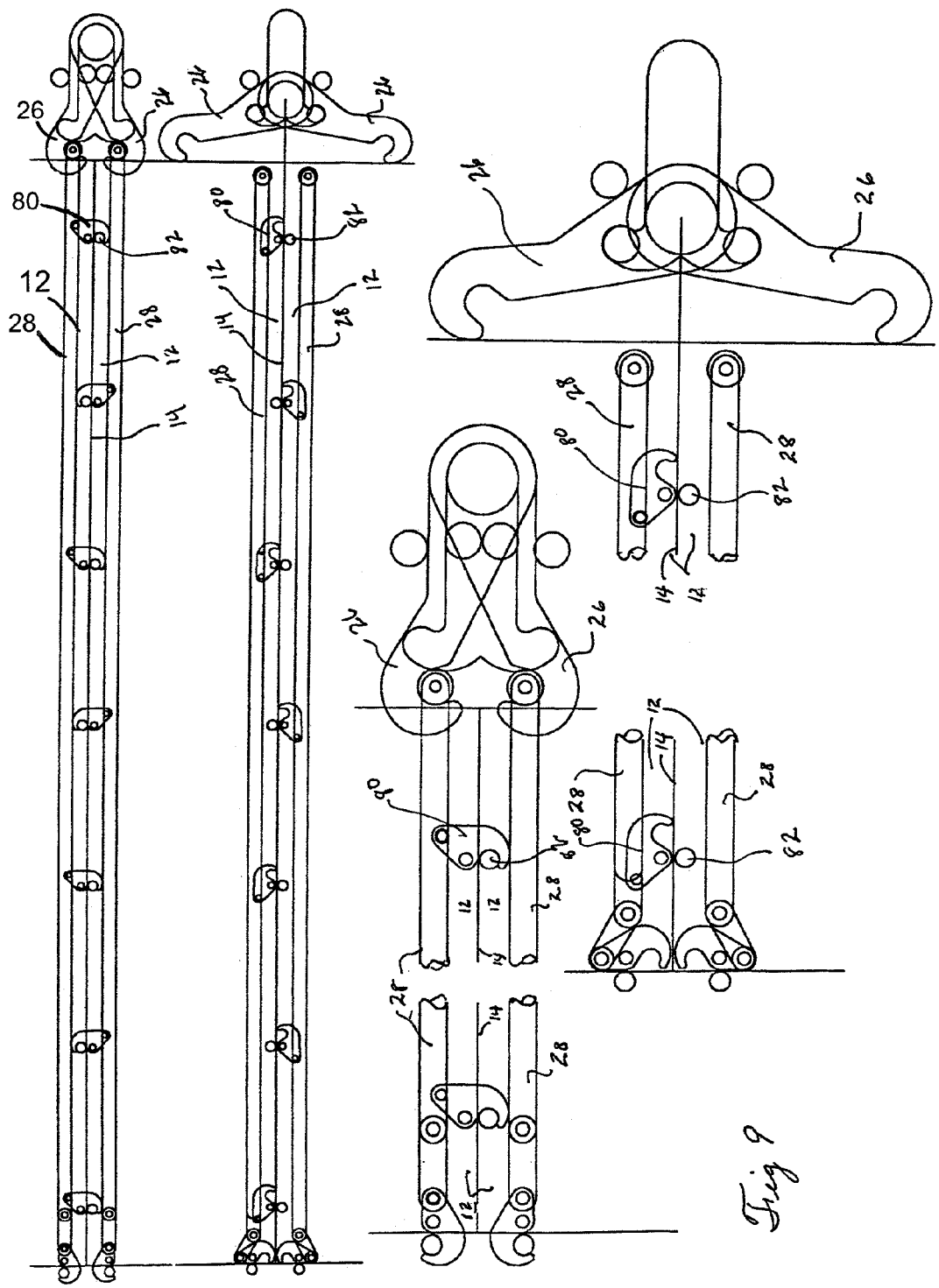

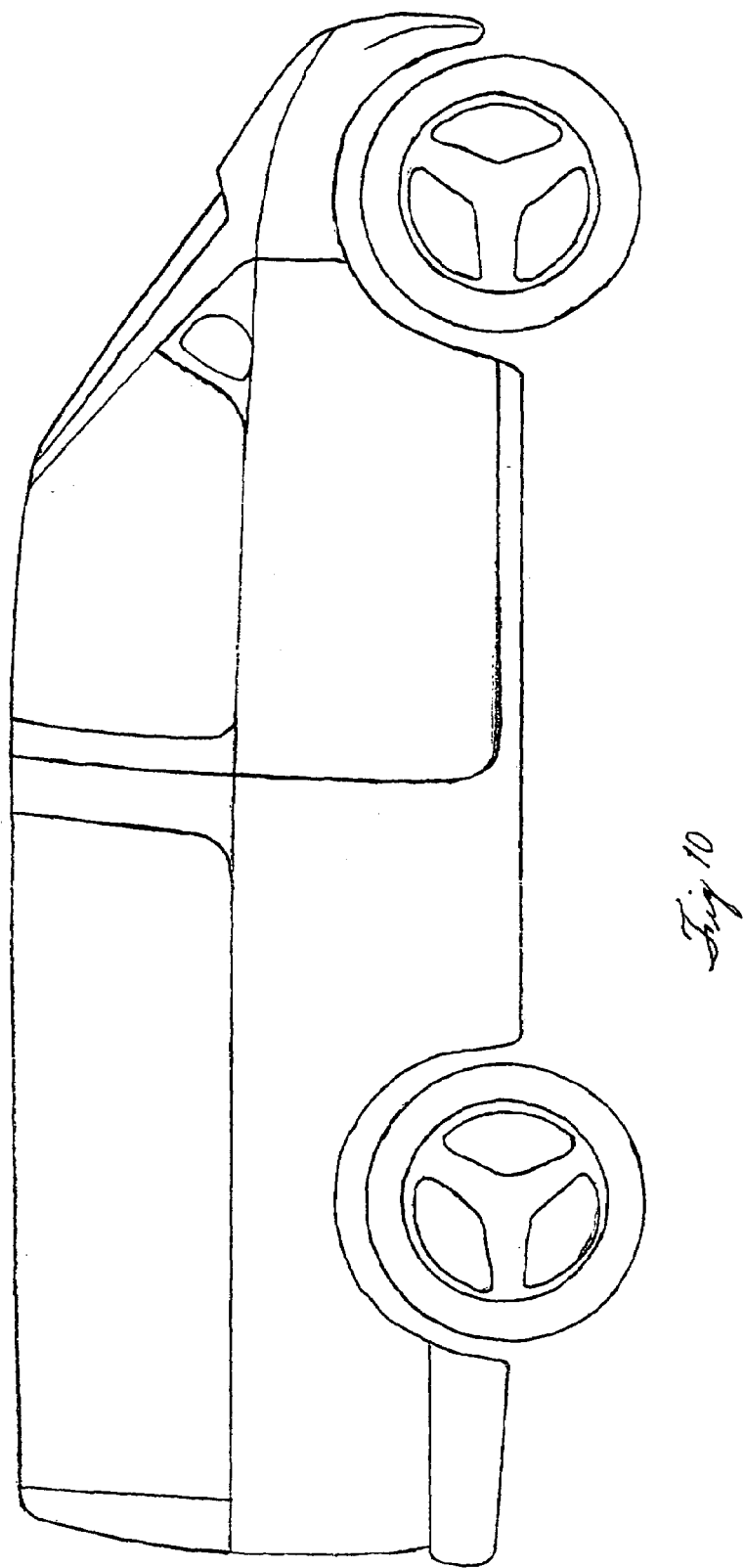

CONVERTIBLE VEHICLE

RELATED APPLICATIONS

This application claims the benefit of U.S. Provisional Application No. 60/534,462, filed Jan. 6, 2004. This application is herein incorporated in its entirety by reference.

FIELD OF THE INVENTION

The invention relates to vehicles, and more particularly, to a sport utility vehicle having convertible cargo space.

BACKGROUND OF THE INVENTION

Sport Utility Vehicles or SUVs have been highly popular with consumers allowing the transportation of passengers in some degree of comfort while providing a substantial cargo space. Features, such as four-wheel-drive and higher ground clearance, have likewise appealed to many consumers.

The cargo space of traditional sport utility vehicles has however been limited by the vehicle's closed roof. Other vehicles such as pickup trucks have open cargo sections, which do not restrict tall or unusually shaped cargo, and facilitate loading. While a variety of carmakers have introduced concept SUVs and occasionally production models having retractable or removable roofs, most such models retain full height sidewalls, which hinder loading from the side and restrict the cargo capacity of the product. In models where the user must remove roof sections, the roof section is a cumbersome, inconvenient extraneous element liable to damage. Particularly in developing countries, four-door compact pick up trucks are highly desirable, combining passenger capacity with utilitarian cargo capacity. Other such hybrid vehicles can be expected to be at least equally attractive to consumers, and may stimulate demand in developed markets as well.

What is needed, therefore, are techniques for allowing a user to convent space in a vehicle between use as a passenger compartment and use as a cargo space.

BRIEF SUMMARY OF THE INVENTION

One embodiment of the present invention provides a system for retraction and deployment of a covering over at least a portion of a vehicle interior, the system comprising: first and second roof panels; first and second sidewall panels; and posterior and anterior roll bars, each roll bar having at least one channel whereby the first and second roof panels and the first and second sidewall panels are guided between a deployed position and a stowed position, such that when the panels are in the deployed position the vehicle is enclosed and when the panels are in a stowed position the vehicle is at least partially open.

Another embodiment of the present invention provides such a system wherein the first roof panel is hingebly coupled to the first sidewall panel and the second roof panel is hingebly coupled to the second sidewall panel.

A further embodiment of the present invention provides such a system further comprising a hinge shaft extending through a hinge disposed between the first roof panel and the first sidewall panel.

Still another embodiment of the present invention provides such a system wherein posterior and anterior ends of the hinge shaft extend beyond the length of the panels and are disposed within the channels.

A still further embodiment of the present invention provides such a system further comprising a roof panel deployment and retraction assembly comprising: at least one actuation cable; at least one actuation arm coupled at a first end to the hinge shaft and coupled at a second end to the actuation cable; at least one follower cam disposed at the second end of the actuation arm; such that the actuation cable controls the movement of the first roof panel and the first side panel.

Even another embodiment of the present invention provides such a system wherein the posterior roll bar is moveably disposed on a track.

An even further embodiment of the present invention provides such a system wherein the anterior roll bar is movably disposed on a track.

Yet another embodiment of the present invention provides such a system further comprising a tailgate panel, that tailgate panel being reconfigurably disposable between a posterior end and an anterior end of a portion of the vehicle covered by the first and second roof panels, alternatively the tailgate may be a conventional tailgate like that of a pickup, and the vehicle further comprise a stowable gate disposed between the passenger area and the cargo area.

A yet further another embodiment of the present invention provides such a system wherein the first and second roof panels are detachably coupled by a locking system.

Still yet another embodiment of the present invention provides such a system wherein the first and second roof panels are configured to be stowed within a fixed sidewall of the vehicle.

One embodiment of the present invention provides a system for retraction and deployment of a covering over at least a portion of a vehicle interior, the system comprising: a plurality of interlocking body panels having anterior and posterior ends; anterior and posterior roll bars to which the anterior and posterior ends are slidably coupled.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1 is a perspective view illustrating a reconfigurable vehicle configured in accordance with one embodiment of the present invention.

FIG. 2A is a sectional elevation view illustrating a roof and side panel deployment assembly of a reconfigurable vehicle in a deployed position configured in accordance with one embodiment of the present invention.

FIG. 2B is an elevation view illustrating a roof and side panel deployment assembly of a reconfigurable vehicle in a stowed position configured in accordance with one embodiment of the present invention.

FIG. 4 is a sectional elevation view illustrating a detail of a stowable roll bar assembly of a reconfigurable vehicle configured in accordance with one embodiment of the present invention.

FIG. 5 is a perspective view illustrating a detail of a stowable roll bar assembly of a reconfigurable vehicle configured in accordance with one embodiment of the present invention.

FIG. 6 is a side perspective view illustrating a reconfigurable vehicle having a stowed posterior roll bar configured in accordance with one embodiment of the present invention.

FIG. 7 is a rear elevation view illustrating a reconfigurable vehicle having a roof and side panel in a stowed position configured in accordance with one embodiment of the present invention.

FIG. 8 is a side elevation view illustrating a reconfigurable vehicle having a roof and side panel in a stowed position and a plurality of passenger seats disposed in the rear of the vehicle, configured in accordance with one embodiment of the present invention.

FIG. 9 is a planar view illustrating a joint closure and locking mechanism for use in a reconfigurable vehicle configured in accordance with one embodiment of the present invention.

FIG. 10 is a side elevation view illustrating a reconfigurable vehicle having a roof and side panel in a fully deployed position.

DETAILED DESCRIPTION OF THE INVENTION

Figures 3A, 3B:
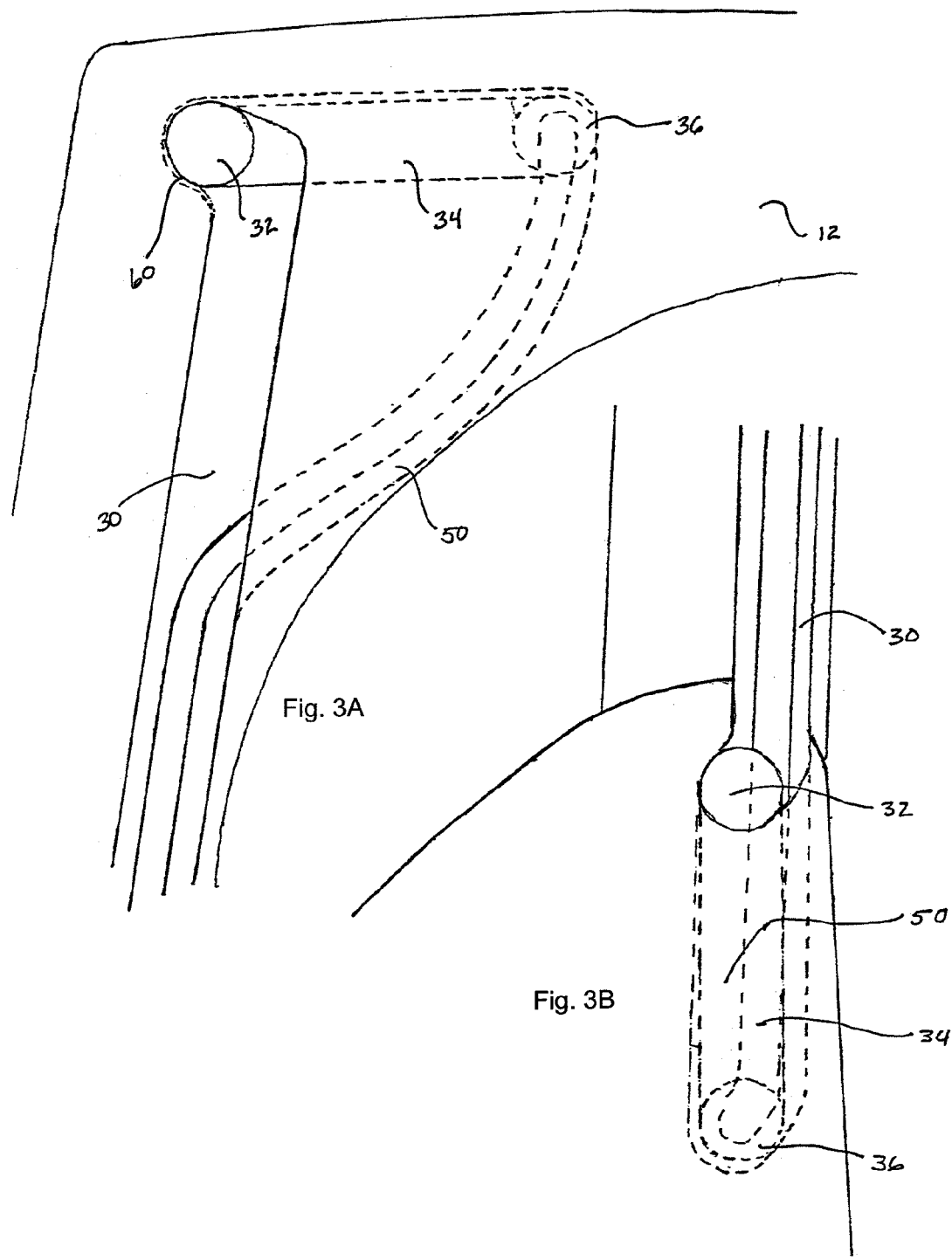
FIG. 3A is an elevation view illustrating a roof and side panel deployment channel of a reconfigurable vehicle in a deployed position configured in accordance with one embodiment of the present invention.
FIG. 3B is an elevation view illustrating a roof and side panel deployment channel of a reconfigurable vehicle in a stowed position configured in accordance with one embodiment of the present invention.

FIG. 1 is a perspective view of a sport utility vehicle 10 having a longitudinally divided, folding cargo bay roof and folding sides, configured according to one embodiment of the present invention. First and second roof panels 12 are disposed over the cargo bay 18 of a convertible sport utility vehicle. The roof panels 12 are detachably joined along a central joint 14. The roof panels 12 are coupled to sidewall panels 16. In one embodiment, the roof panels 12 are configured to fold over the sidewall panels 16. The sidewall panels 16 retract, drop, or fold into the body of the cargo bay 18. In this way, the covered cargo area 18 of the sport utility vehicle can be converted into an open cargo area 18 like that of a pickup truck. In an alternative embodiment, the roof panels 12 and sidewall panels 16 may be independently retractable facilitating the opening of the sides, the roof or both.

According to one embodiment, anterior and posterior roll bars 20, 22 are provided for reinforcing the covered cargo compartment 18 in the event of a roll over. The anterior roll bar 20 can be integrally disposed in posterior portions of the passenger cab 24. The posterior roll bar 22, when the cargo bay covering 12, 16 is deployed, is disposed at the posterior end of the cargo bay 18 such that a roll bar 20, 22 is disposed on either end of the folding enclosure panels 12,16. These anterior and posterior roll bars 20,22, not only provide structural support in the event of roll over and crash, but, in one embodiment illustrated in FIG. 2A, provide channels 30 wherein guide pins 32 extending from the panels 12,16 are disposed and whereby the panels 12, 16 are guided into open or closed configurations. According to one embodiment, only one or two actuators would be necessary for the deployment and stowing of the roof and side panels 12, 16 of the cargo compartment 18. Each actuator would be coupled to a plurality of rods or cables. These cables/rods may comprise a central cable about which is disposed a spiral or helical cable. The cable is disposed in a channel disposed within each of the roll bars 20,22. The actuator would lift both halves of the roof at the same time and would allow the roof panels 12 to engage while rotating, facilitating a tighter joint 14 between the panels 12. The push cable or rod attaches to a first arm 34 opposite the hinge pin 32 and at about the center of a first cam follower 36 mounted on the first torque arm 34. A slot or channel 30 is disposed on the opposing faces of the roll bars. The push cable is disposed within a track 50 disposed proximate to the channel or slot 30. The first cam followers 36 likewise ride in this track 50 and are actuated by the movement of the push cable. The shaft 32 of the hinge 46 is disposed to ride in the channel 30. The cam follower 36 and the arm 34 translate the force applied by the cable 38 to the shaft 32 of the hinge, forcing the shaft 32 to travel in the channel 30, and deploying the roof panel 12 at the top of the travel. One skilled in the art will readily appreciate that in an alternative embodiments, the channels 30 and tracks 50 may be disposed in the posterior face of the passenger cab, rather than in a roll bar 20, provided that the passenger cab has adequate structural integrity to prevent collapse in the event of the roll over of the vehicle.

Referring to FIG. 3A, when the roof panel 12 is in an intermediate position between the vertical stowed position and the fully deployed, substantially horizontal position, the cam follower 36 and the actuation arm 34 force the shaft 32 of the hinge 46 into a notch or indentation 60 in the channel 30. The notch 60 supports the weight of the roof and side panels 12, 16, while in transition. The force applied by the cable to the cam follower 36 and actuation arm 34 is then free to rotate the roof panel 12 into a deployed position, covering the cargo compartment 18.

As illustrated in FIG. 3B, when the roof panel is in a stowed position, the cam follower 36 and the actuation arm 34 are approximately aligned with the channel 30. The track 50 wherein are disposed the cam follower 36 and the actuation/torque arm 34 extends further into the body of the cargo compartment than the channel 30. Thus, as illustrated in FIG. 2B, the folded side and roof panel assembly, 16,12 folds tightly against the fixed side of the cargo compartment 18.

One skilled in the art will readily appreciate that other actuation and folding systems are within the scope of the present invention. In one embodiment, the roof 12 and side panels 16 may be configured to independently be moveable in separate tracks disposed in the roll bars 20,22. In such an embodiment, the roof 12 and wall panels 16 may be configured to stow in the fixed sides of the cargo compartment 18, or may be along the inside side such that a resilient surface of the panel is exposed to the inside of the open cargo compartment 18. In one such embodiment, the roof panel 12 is disposed on cam followers located on the corners of the panel, which follow the track and thereby reorient the roof panel 12 between the horizontal and the vertical positions. A resilient surface may be disposed on the inside of the roof panel 12 preventing damage from cargos or passengers that might otherwise occur when the roof is lowered. Alternatively, the roof panel 12 may be disposed within the fixed sidewall, and be protected by that fixed wall. In such an embodiment, the width of the cargo space is reduced. In another such embodiment, both the side 16 and the roof panel 12 are independently hinged. The side 16 is configured to fold inward, and the roof panel 12 is configured to hinge inward from the vertical position so as to cover and protect the folded sidewall panel 16. The panels 12, 16 nest in their folded position. By folding these panels down, an aesthetically pleasing profile is provided to the interior of the cargo/passenger compartment 18. Embodiments wherein the window 48 is retracted into the fixed sidewall of the cargo compartment while the roof panel 12 nests over the interior of the fixed sidewall are also within the scope of the present invention.

As illustrated in FIGS. 4, 5, and 6, the posterior roll bar 22 may be configured to be stowed when the cargo bay enclosure panels 12, 16 are stowed. Referring to FIGS. 4 and 5, the posterior roll bar 22 may, according to one embodiment, be disposed on a track 52 mounted in the fixed sidewall of the cargo bay 18. The posterior roll bar 22 can then be slid forward so as to join the anterior roll bar 20. The coupling of the anterior and posterior roll bars 20, 22 close the channels or slots 30. Those slots 30 are closed in the pickup mode preventing contamination and damage to the channels 30. Slots 30 are vertical and readily shed any dirt that does get in. One such embodiment provides bearings 56, riding in a track 52 mounted on the underside of the top lip 54 of the fixed sidewall. The bearings 56 are coupled to the ends of the posterior roll bar 22. The end is configured with a profile that allows for passage over the folded roof and side panels 12, 16 without contact. In alternative embodiments, additional bearings may be provided such that the folded roof and side panels 12, 16 support the transitioning roll bar. Alternative embodiments wherein the posterior roll bar 22 may fold in the tail of the vehicle or be otherwise stowed would likewise be within the scope of the present invention. In still further embodiments, the rear window or rear wall may be configured to slide with the roll bar, enclosing the passenger cab when the cargo area is open. Alternatively, the rear window may retract into the tailgate, and a retractable partition may be disposed at the back of the passenger cab.

Referring to FIG. 7, which illustrates one embodiment wherein a convertible cargo compartment is in an open configuration. In this illustration, the posterior roll bar has not been shown so as to facilitate the view of other elements. The roof panels 12 and sidewall panels 16 are folded against the interior walls of the cargo compartment 18, and are located behind the rear post 70 disposed in the rear of the vehicle body 72. The sidewall panels 16 may be configured from polycarbonate plastic and other such high strength plastics. Polycarbonate panels have the advantage of providing superior strength without an obstructed view. The roof panels 12 may be configured from impact and scratch resistant materials, such as urethane-based polymers or from materials coated with such materials. One skilled in the art will readily appreciate that the interior of the fixed side of the cargo compartment 18, in this embodiment, is not exposed to the elements and may be configured with upholstery, storage compartments, cup holders and other amenities for passengers.

One skilled in the art will readily appreciate that while the embodiments described herein have referred the area covered by the deployable panels 12, 16 as the cargo compartment 18, seats and other passenger accommodations may be removably or stowably disposed therein converting it to a passenger compartment. Folding seats may be installed in the cargo area to facilitate larger passenger capacities. An example of such an embodiment is illustrated in FIG. 8. As illustrated in FIG. 8, in at least one embodiment, the posterior roll bar 22 may be optionally disposed at the rear of the cargo/passenger position affording protection to passengers riding in the rear of the vehicle and providing a support for roof racks upon which ladders, canoes, boats and other long items may be transported.

Referring to FIG. 9, which illustrates the joint closure mechanism of one embodiment of the present invention. Actuator hooks 26 are configured to detachably couple to sliding actuator bars 28. Disposed on opposing sides of the joint 14 between the roof panels 16. The actuator hook 26 allows a user to manipulate the actuator bars 28 so as to activate the joint closure mechanism and to secure the joint 14. Disposed on the actuator bar 28 is a plurality of locking hooks 80. Each locking hook is configured to be deployed by the action of the actuator bar 28 and to engage a locking pin 82 disposed on the opposing roof panel 16. One skilled in the art will readily appreciate that such configuration may be manually or automatically actuated and that other locking configuration may be employed. In one embodiment, when engaged, locking hooks couple not only the panels of the roof to each other, but also secure the panels against the respective roll bars.

One skilled in the art will readily appreciate that other embodiments may provide actuation systems different from that described above. Linear motors or hydraulic cylinders may be employed to provide movement. Such actuation means may be coupled to the panels either directly or mechanical, though tracks in the roll bars such as those described above, or may be magnetically coupled to the panels by magnets disposed within the roll bar. In this later case, the roll bars would necessarily be of non-ferrous or non-magnetic material.

Not illustrated but readily evident from the foregoing descriptions, there is yet another embodiment that employs the simple, hinged panel mechanism of a roll top desk, but configured as left and right side and top panel assemblies that slide downward for stowage and upward to meet in a sealing manner at a rooftop centerline. There may be a latch mechanism for assuring a locked-together closed position. Left and right panel drive mechanisms may be one or a variant of the drive mechanisms illustrated and explained above, whether manually operated or motorized. Either side may be operated independently of the other. The individual panels, typically having a common length, may be transparent, translucent or otherwise; and may vary in composition and width. The hinge line or mechanism connecting the long edges of the panels may be a flexible fabric, plastic or other material, or be a mechanical hinge. The panels may incorporate edge seals that are brought into a sealing interpanel relationship when the side and top panel assemblies are fully extended upward to enclose the vehicle. One skilled in the art will also readily appreciate that another alternative embodiment may be employed wherein the panels are disposed in separate tracks and are independently controlled, and configured such that when at least two such panels are fully deployed the fully deployed panels interlock or otherwise contact each other to form a weather tight seal, such as with gaskets or other known methods. The stowage area for the side and top panel assemblies may consist of space within the sidewall and extending beneath the floor or deck of the vehicle.

Figure 11A:
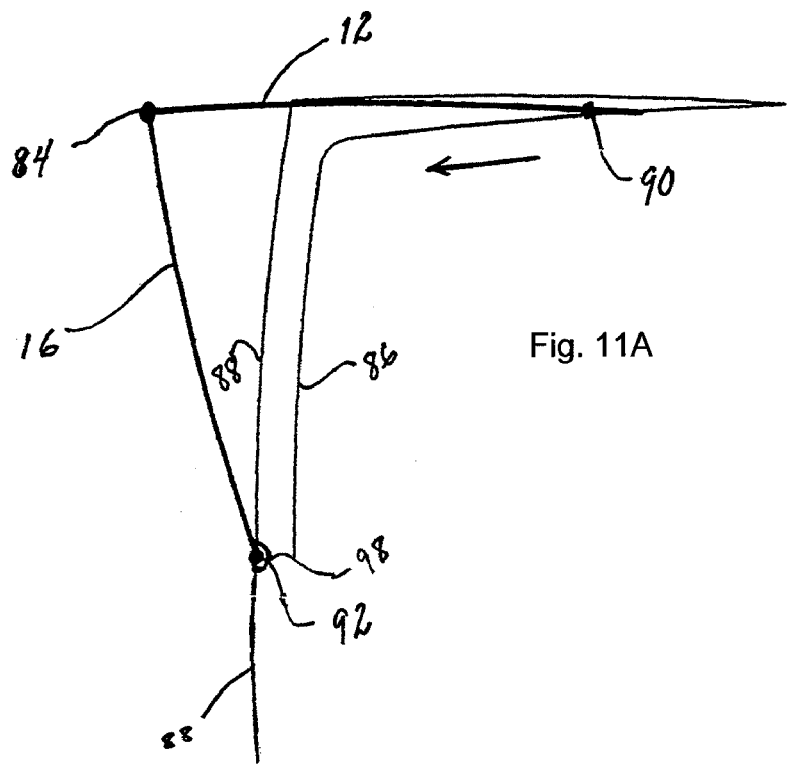
FIG. 11A is a schematic side elevation view illustrating a reconfigurable vehicle having a roof and side panel in a partially deployed position.
Figure 11B:
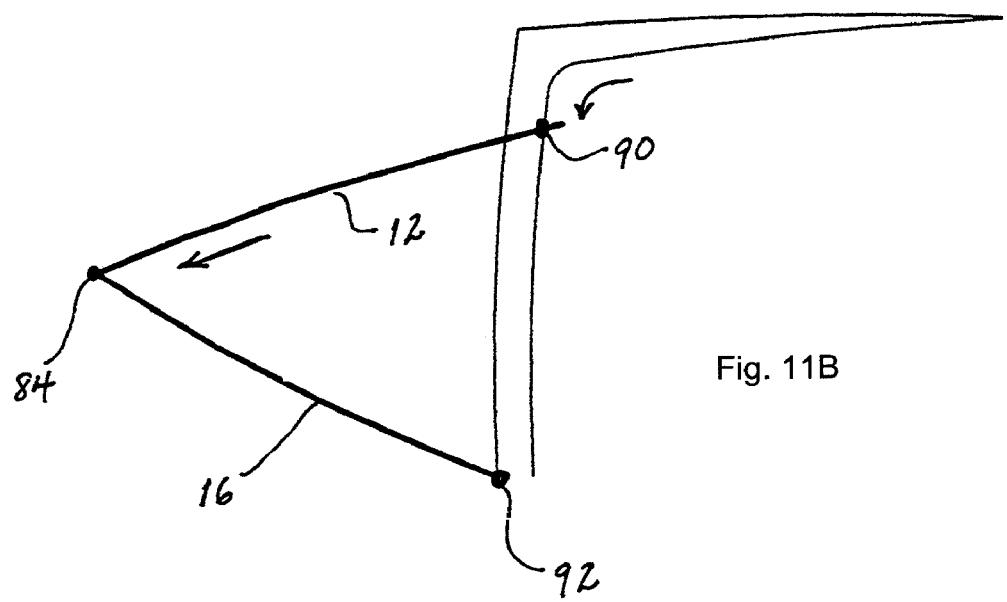
FIG. 11B is a schematic side elevation view illustrating a reconfigurable vehicle having a roof and side panel in a partially deployed position.
Figure 11C:
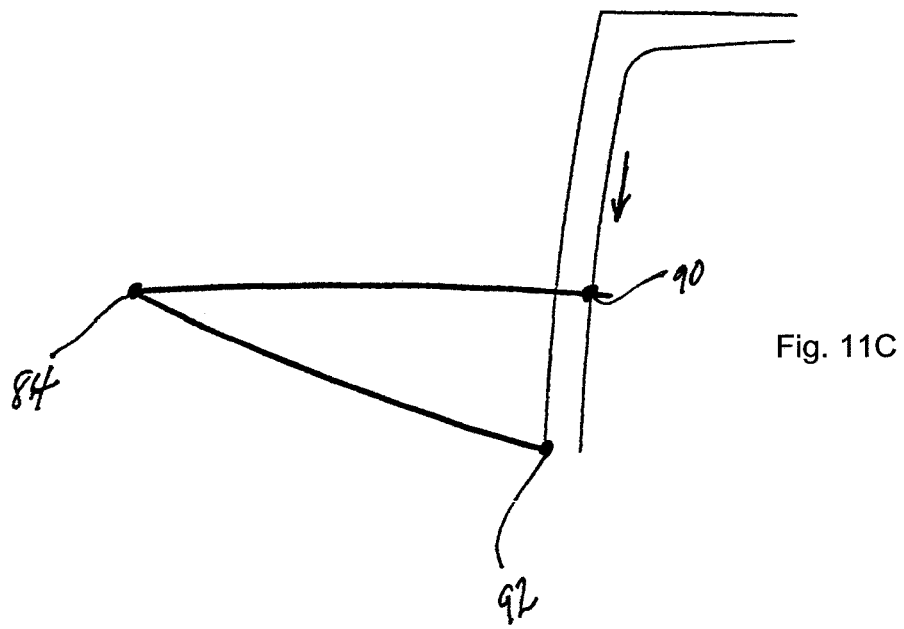
FIG. 11C is a schematic side elevation view illustrating a reconfigurable vehicle having a roof and side panel in a partially deployed position.
Figure 11D:
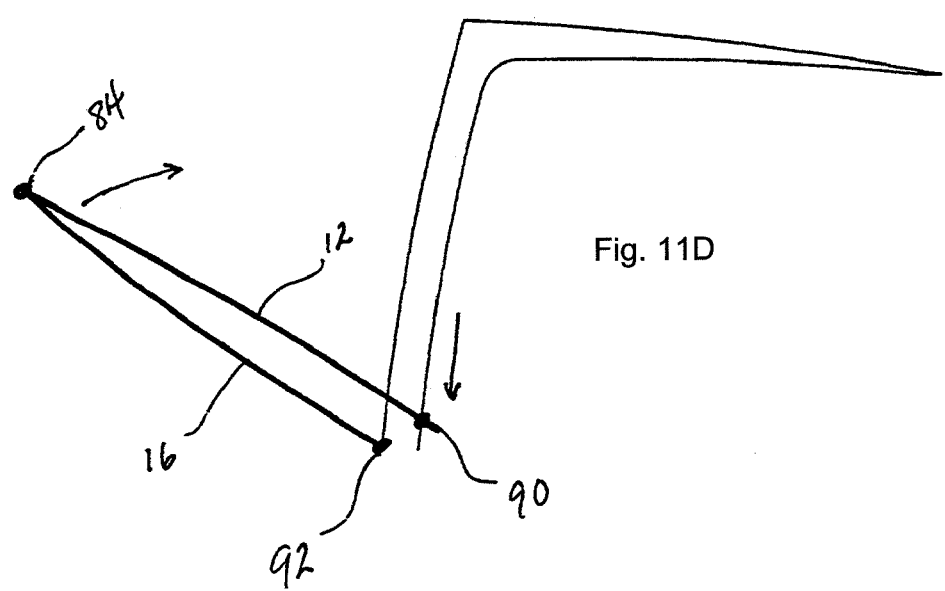
FIG. 11D is a schematic side elevation view illustrating a reconfigurable vehicle having a roof and side panel in a partially deployed position.
Figure 11E:
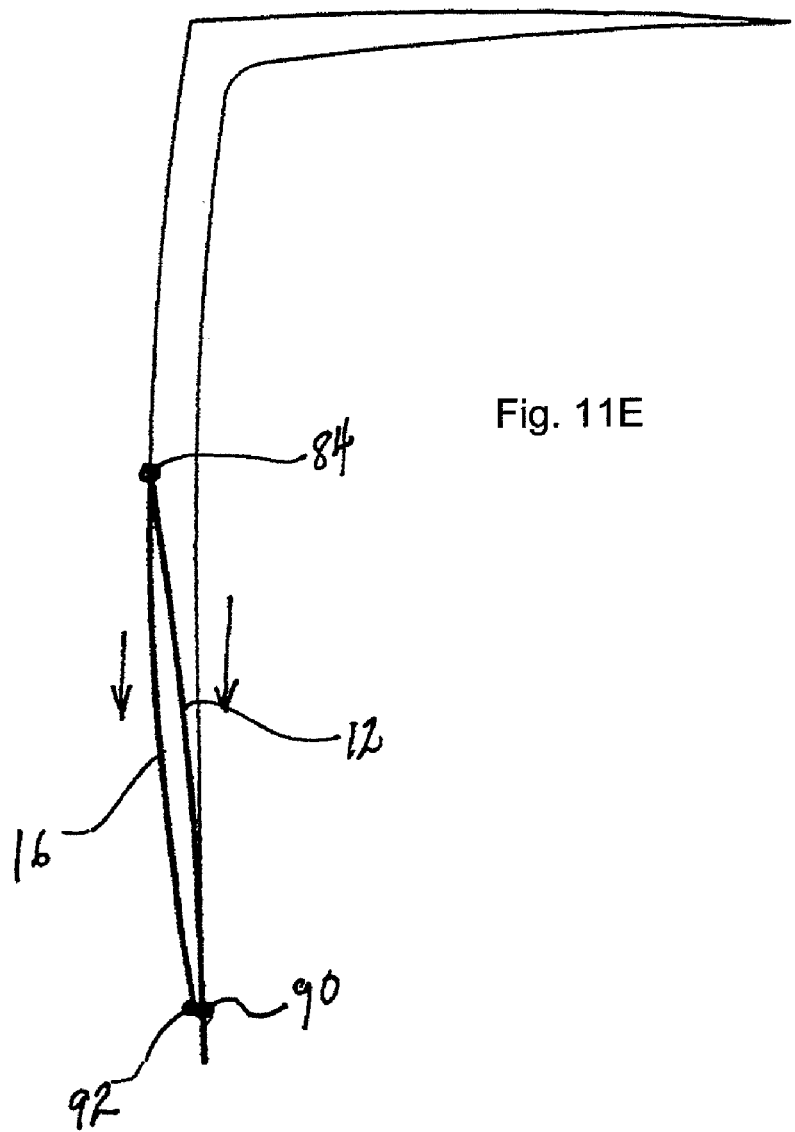
FIG. 11E is a schematic side elevation view illustrating a reconfigurable vehicle having a roof and side panel in a partially stowed position.

In an alternative embodiment, illustrated in FIGS. 11A–11E, the roof 12 and side panels 16 may be disposed upon traveling pivots set in first 86 and second tracks 88 disposed within, or proximate to, the roll bars. Such an embodiment provides conversion between deployed and retracted roof positions without interfering with cargo or passengers disposed within said vehicle. The pivots or travelers 90, 92 of the panels are configured to allow the panels 12, 16 to travel between deployed positions to retracted positions. In one embodiment, the roof panel 12 and the side wall panel 16 are joined by a hinge or other equivalent structure 84, such that when the panels 12, 16 are deployed the hinge 84 is disposed between the outboard side of the roof panel 12 and the top of the side wall panel 16. The hinge structure 84 may include as in other embodiments illustrated above, a lip 47, illustrated in FIG. 2A, which when the roof is in the deployed position, seals or closed the gap between the roof panel 12 and the side wall panel 16. When the roof is in the stowed position, the lip acts to protect the hinge 84, the top edge of the side wall panel 16, and the outboard edge of the roof panel 12 from impact, debris, or other damage. The lip may be made, at least in part from impact resistant polymers, such as polyurethanes, polycarbonates, polyethylenes, polyethylene terephthalate, polyvinyl chloride, polypropylene, polystyrene, polytetrafluoroethylene, and polyamide. In some embodiments it may be made from fiber glass or other composites. In one embodiment, the roof panel pivots 90 are disposed a short distance from the centerline of the vehicle or the joint were the roof panel couples the opposing roof panel when the roof panel is deployed. The segment of the roof panel 12 between the hinge 84 and the pivot 90, in some embodiments, is shorter than the segment of the side wall panel 16 disposed between the hinge 84 and the side wall pivot 92. In such an embodiment, the side wall panel pivot 92 is disposed proximate to the edge of the side wall panel 16 furthest from the hinge 84 and interface with the second track 88. The roof panel pivots 90 interface with the first track 86, which is a continuous track having substantially horizontal and substantially vertical sections whereas said second track has a substantially vertical section. Vertical sections of both tracks extend into a cavity or magazines disposed within the side wall of the vehicle bed or alternatively into the vehicle bed itself, with, as in other embodiments describe above, the panels providing a resilient bed interior. In one embodiment, a stop 98 is provided. Such a stop 98 may, in some embodiments comprise a "J" hook whereby downward movement of the side wall panel 16 is arrested until the side wall panel is aligned substantially vertically, as illustrated in FIG. 11E. Alternatively, an automated latch may be used such that vertically support is provided to the side wall panel until the panel is vertically oriented and ready for retraction. One skilled in the art will readily appreciate that a variety of such stopping mechanisms 98 could be employed, and that all such mechanisms would be within the scope of the present invention. As illustrated in FIG. 11A the roof panel 12 is displaced from its fully deployed position, the roof panel pivot 90 travels in the substantially horizontal section of the first track 88, outboard from the central joint between the opposing roof panels. The roof panel 12, at least partially, is extended out form the side of the vehicle during the process. This travel away from the opposing roof panels guides the top of the side wall panel 16 away from the body of the vehicle, allowing the continued travel of the roof panel 12 from the substantially horizontal segment of the track to the substantially vertical section. As the roof panel transitions from the substantially horizontal section of the track to the substantially vertical section of track, the side wall panel 16 extends further from the side of the vehicle, as illustrated in FIG. 11B. However, once the roof panel pivot 90 reaches and continues past a point on the track approximately equal to or lower than the level of the hinge 84, the travel of the roof panel 12 draws the side wall panel into an increasingly substantially vertical orientation. Once both the roof panel and side wall are substantially vertical, the two panels may then be retracted in to the body of the vehicle bed.

Such an embodiment provides roof panels having an outboard edge and a mating edge, sidewall panels having an upper edge and a lower edge, said and at least one hinge or joint coupling the outboard edge of a the first roof panel to said upper edge of a respective first sidewall panel.

The roof panel may have at least one traveler mating with a first channel proximate the mating edge and the sidewall panels may have at least one traveler proximate the lower edge and mating with a second channel. In such an embodiment, the segment of the roof panel between the hinge and the traveler may have a length less than or equal to a length of a segment of the side wall panel between the hinge and said traveler.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited neither by this detailed description nor the claims appended hereto.

Among that which is claimed is:

1. A system for retraction and deployment of a covering over at least a portion of a vehicle interior, the system comprising:
    first and second roof panels;
    first and second sidewall panels; and
    posterior and anterior roll bars, each said roll bar having at least one channel whereby said first and second roof panels and said first and second sidewall panels are guided between a deployed position and a stowed position, such that when said panels are in said deployed position said vehicle is enclosed and when said panels are in said stowed position said vehicle is at least partially open.

2. The system according to claim 1 wherein said first roof panel is hingebly coupled to said first sidewall panel and said second roof panel is hingebly coupled to said second sidewall panel.

3. The system according to claim 2 further comprising a hinge shaft extending through a hinge disposed between said first roof panel and said first sidewall panel.

4. The system according to claim 3 wherein posterior and anterior ends of said hinge shaft extend beyond the length of said panels and is disposed within said channels.

5. The system according to claim 4 further comprising a roof panel deployment and retraction assembly comprising:
    at least one actuation cable;
    at least one actuation arm coupled at a first end to said hinge shaft and coupled at a second end to said actuation cable;
    at least one cam follower disposed at said second end of said actuation arm;

such that said actuation cable controls the movement of said first side panel and said first side wall.

6. The system according to claim 1 wherein said posterior roll bar is moveably disposed on a track.

7. The system according to claim 1 wherein said anterior roll bar is movably disposed on a track.

8. The system according to claim 1 wherein said first and second roof panels are detachably coupled by a locking system.

9. The system according to claim 1 wherein said first and second roof panels are configured to be stowed within a fixed sidewall of said vehicle.

10. The system according to claim 1 wherein said anterior roll bar is integral to a body of a cab of said vehicle.

11. The system according to claim 1, each said first and second roof panels comprising an outboard edge and a mating edge, each said first and second sidewall panels comprising an upper edge and a lower edge, said system further comprising at least one hinge coupling said outboard edge of a said first roof panel to said upper edge of said first sidewall panel.

12. The system according to claim 11, said first roof panel comprising at least one roof panel traveler mating with a first said at least one channel proximate said mating edge, said first sidewall panel comprising at least one side wall panel traveler proximate said lower edge and mating with a second said at least one channel.

13. The system according to claim 12 wherein a segment of said first roof panel between said hinge and said roof panel traveler has a length less than or equal to a length of a segment of said first side wall panel between said hinge and said side wall panel traveler.

14. The system according to claim 11 wherein said hinge further comprises a lip such that said lip covers said hinge when said first roof panel is fully deployed.

15. The system according to claim 14 wherein said lip is configured to protect said hinge when said first roof panel is in a fully retracted position.

16. The system according to claim 14 wherein said lip comprises an impact resistant material selected from the group of impact resistant materials consisting of an impact resistant polymer, metal, or composite material.

17. The system according to claim 14 wherein said impact resistant polymer is selected from the group of impact resistant polymers consisting of urethanes, polycarbonates, polyethylenes, polyethylene terephthalate, polyvinyl chloride, polypropylene, polystyrene, polytetrafluoroethylene, and polyamide.

18. A method for retracting a convertible cargo compartment roof of a vehicle; said method comprising:
   Separating first and second roof panels along a longitudinal joint;
   Sliding said first roof panel outboard from said longitudinal joint;
   Permitting a top edge of a first side wall panel coupled to an outboard side of said first roof panel to travel outboard from said longitudinal joint;
   Holding a lower edge of said first sidewall panel proximate to a wall of said vehicle;
   Lowering an inboard edge of said first roof panel;
   Raising and drawing said top edge toward said vehicle, such that said first roof panel and said first side wall panel are disposed in a vertical position with said tope edge and said outboard edge disposed upwards; and
   Stowing said first roof panel and said first side wall panel within said vehicle.

* * * * *